United States Patent

[11] 3,581,242

| [72] | Inventor | Louis J. Lavedan<br>Clearwater, Fla. |
|---|---|---|
| [21] | Appl. No. | 867,619 |
| [22] | Filed | Oct. 20, 1969 |
| [45] | Patented | May 25, 1971 |
| [73] | Assignee | The United States of America as represented by the Secretary of the Air Force |

[54] VARIABLE POLARIZER FOR MICROWAVE SYSTEMS
1 Claim, 5 Drawing Figs.

[52] U.S. Cl. .................................................. 333/1,
333/6, 333/9, 333/21A, 333/31A
[51] Int. Cl. ........................................................ H01p 5/12,
H01p 1/16, H03h 7/36
[50] Field of Search............................................ 333/21, 1,
31, 6, 9; 343/854, 756, 778

[56] References Cited
UNITED STATES PATENTS

| 2,851,681 | 9/1958 | Cohn........................... | 333/21X |
| 3,307,189 | 2/1967 | Meade.......................... | 343/777X |
| 3,355,735 | 11/1967 | Chait............................. | 343/854X |
| 3,380,053 | 4/1968 | Connolly...................... | 343/854X |
| 3,480,958 | 11/1969 | Tcheditch.................... | 343/854X |

Primary Examiner—Herman Karl Saalbach
Assistant Examiner—Marvin Nussbaum
Attorneys—Harry A. Herbert, Jr., and Henry S. Miller, Jr.

ABSTRACT: A dual-channel receiver polarizer microwave system including a pair of waveguide systems each having adjustable phasers mounted in parallel and in series and connected to a source of input signals and a multimode transducer for transmitting and the transducer and a receiver for receiving.

INVENTOR.
LOUIS J. LAVEDAN
BY Harry A. Herbert Jr
ATTORNEY
Henry S. Miller
AGENT

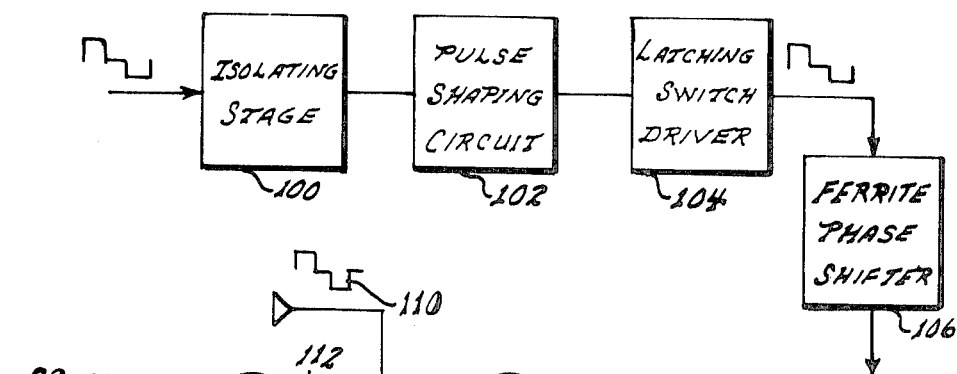
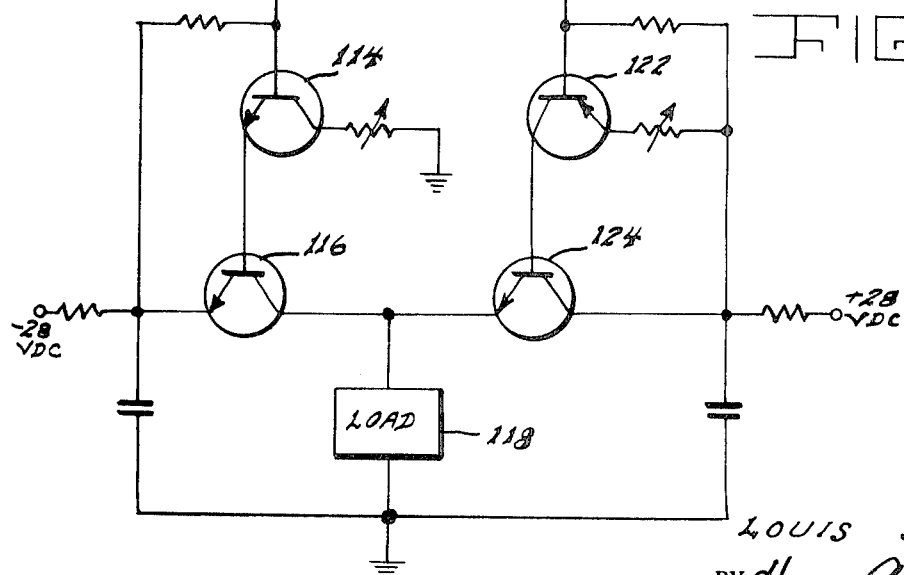

VARIABLE POLARIZER FOR MICROWAVE SYSTEMS

BACKGROUND OF THE INVENTION

This invention relates generally to a system for polarizing microwaves and more specifically to a microwave polarizing system that may be incorporated as part of a dual channel radar receiver system for target identification.

The art of target acquisition and identification by radar systems has now become so sophisticated that it is possible to identify objects not merely as existing but to further indicate such parameters as shape and in the case of artificial earth satellites, roll and tumble.

A preferred method of obtaining accurate radar information is by analyzing the return polarizations of transmitted radar signals. In the past this technique has been attempted utilizing a single receiver output system, wherein the minor return polarizations, which contain desired information, are completely masked out. The cause of the masking effect lies in the inability of the single receiver to attain proper switching of phaser elements in the system.

As a result, in operation, it is possible to receive only the principal or transmitted polarizations in the receiver mode.

If a polarization other than that intended is received, as is the case with practical targets, it cannot be separated from the principle target return and will appear as an error in the system.

SUMMARY OF THE INVENTION

The dual channel receiver polarizer system of this invention is generally similar to the single channel receiver system except in providing two receiver outputs. The advantage connected with use of a dual channel receiver is that phase and amplitude information of two orthogonal receive components is retained from the antenna to the receiver. Thus, if a suitable phase and amplitude IF system is employed in conjunction with a suitable reference signal, electronic circuits can separate the various polarizations present in a return signal for any transmit polarization.

The basic microwave polarizer employed in the invention is a waveguide device which converts an incoming signal from the power source in the fundamental $TE_{10}$ mode to two orthogonal components with definite but variable time phase relationships in a single output structure. Similarly any return signals entering the output port will be suitably converted into one or more receive signals for further receiver processing. Depending upon the type of phasing elements employed and the complexity of the polarizer system, this return signal will appear at the input or transmit port or one or more specifically designated receive ports. If one or more separate receive ports are employed, the polarizer will function as a duplexer in that isolation of the transmitter from the receiver is attained.

A single incoming signal is divided into two equal parts by means of a magic tee or short slot hybrid. The two outputs have a specific relative phase. These two signals pass through suitable phasers which alter the relative phase difference between the signals to predetermined values. These two signals are then fed to a suitable multimode transducer. The resultant output is a signal that can be described as being polarized elliptically to any degree from circular to linear and the axis of the ellipse is variable from a reference plane of the multimode transducer.

It is therefore an object of this invention to provide a new and improved microwave system for recognizing target characteristics by detecting minor polarization changes in signals reflected by the target.

It is another object of this invention to provide a new and improved microwave system that will separate polarization changes in reflected signals.

It is a further object of this invention to provide a new and improved variable polarizer for microwaves.

It is still another object of this invention to provide a high power variable polarizer which utilizes nonreciprocal waveguide latching phasers.

It is still a further object of this invention to provide a new and improved dual-channel receiver polarizer for microwave systems.

These and other advantages, features and objects of the invention will become more apparent from the following description taken in connection with the illustrative embodiment in the accompanying drawings, wherein:

DESCRIPTION OF THE DRAWINGS

FIG. 4 is a simplified block of the circuit used to drive the phasers in the invention; and FIG. 5 is a schematic diagram of the phase shift driver circuit embodied in the invention.

DESCRIPTION OF THE PREFERRED EMBODIMENT

Figure 1:
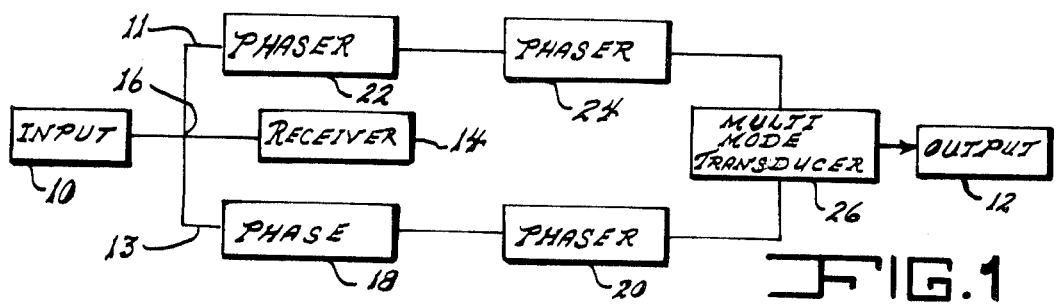
FIG. 1 is a block diagram of a singe receiver port microwave polarizer.

Referring now to FIG. 1, there is shown a single receiver port polarizer. The system is a waveguide device which converts an incoming signal from power source 10 in the fundamental $TE_{10}$ mode to two orthogonal components with definite but variable time phase relationship in a single output structure. Similarly any return signals entering through the output port 12 will be converted into one or more received signals for further processing in the receiver 14.

The incoming signal is divided into two equal parts by means of a "Magic-T" or "short slot hybrid" 16. The two outputs have a specific relative phase. These two signals pass through phasers 18 through 24 which alter the relative phase difference between the signals to predetermined values. These two signals are then fed to a multimode transducer 26. The resultant output is a signal that can be described as being polarized elliptically to any degree from circular to linear and the axis of the ellipse is variable from a reference plane of the multimode transducer.

The mode transducer is employed in a restricted manner in that under all modes of operation including linear polarization, two signals enter the device.

In operation, each of the phasers 18 through 24 are connected so that they may be switched independently from the remainder. Since the input power splitter is of the "Magic-T" variety there is zero phase difference between the arms 11 and 13. For example, if the phasers are given the following settings, phaser 22=0°, phaser 24=—90°, phaser 18=0° and phaser 20=0° and the signal is in the forward direction (input to output) the signals appearing at the ports of the mode transducer will have a 90° phase difference producing a circular polarization.

Alternatively the receive signals returning through the mode transducer will have the same phase relationship as on transmit. Because the phase elements are nonreciprocal, however, the return element phase will be phaser 22=—90°, phaser 24=0°, phaser 18=—90°, and phaser 20=—90°, if the elements are not switched. The return signal will then recombine into a single signal which travels to the input port. Under these conditions no duplexing isolation is attained in the polarizer and a separate duplexer for separation of the receive signals is required. If, however, phaser 18 and phaser 20 are reversed to produce phaser 18 =18=phaser 20 =0 for the return signals, then the receive signal will progress toward the receive port as shown.

Figure 2:
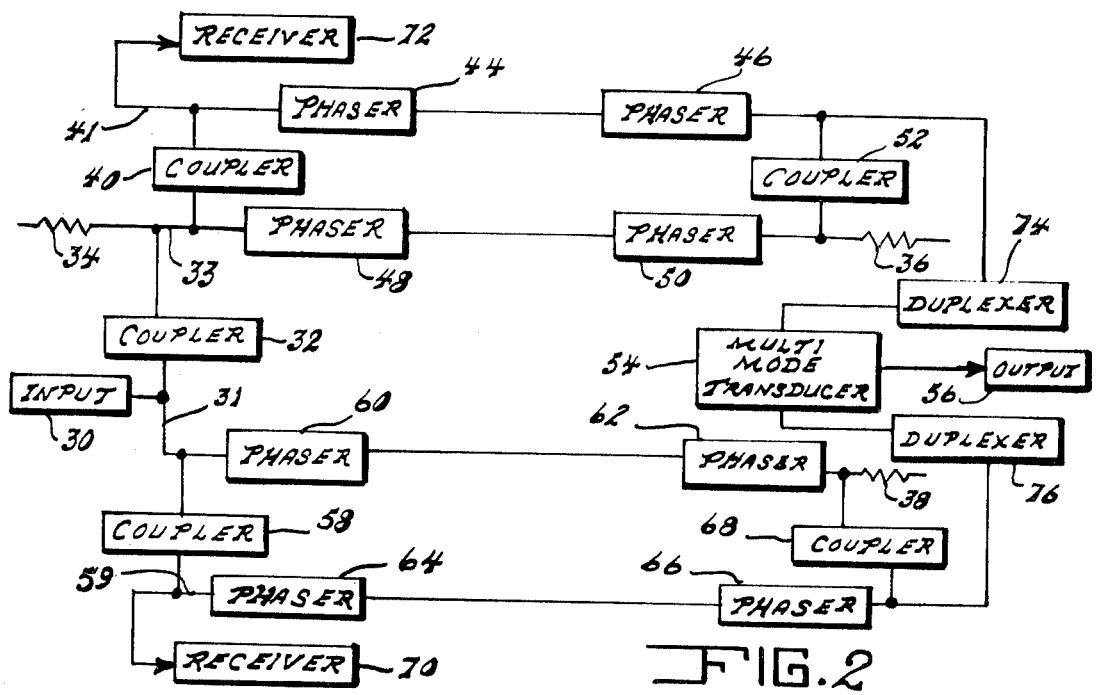
FIG. 2 is a block diagram of the dual-channel receiver polarizer embodied by this invention.

By providing a dual-channel receiver polarizer system such as is shown in FIG. 2 phase and amplitude information of two orthogonal receive components is retained from antenna to receiver.

The signal is provided from the power source through the input 30. The signal is coupled through the coupler 32 from the arm 31 to the arm 33. Each arm is provided with suitable loads 34, 36 and 38 to insure a proper balance between the waveguides.

The signal travels along waveguide 33 where it is coupled via coupler 40 to the arm or waveguide 41. The signal then proceeds through phasers 44 through 50 where the phase adjusted signal in arm 33 is then coupled through the coupling means 52 to the waveguide 41 and thence to the multimode transducer 54 and the output 56.

The input signal likewise traveling along arm 31 passes through coupler 58 to the arm 59 where the signal is phase adjusted in the phasers 60 through 66. The signals are then recombined by the coupler 68 and fed to the multimode transducer 54 and thence to the output 56.

When a receive signal enters the system (which is switched to a receive mode) it follows the same path as the transmitted signal in the reverse direction except that the signals are directed to arms 59 and 41 and thence to receivers 70 and 72 where the signals are processed in a conventional manner. To eliminate any errors through the polarizers in receive mode of operation, phase match duplexers 74 and 76 are incorporated between the multimode transducer and the prephaser couplers.

When the system is utilized as a duplexer-polarizer or alternatively when it is used with separate duplexers, it has the advantage over other systems in that all phaser and duplexer elements, when used, are subject to equal powers and thus the system experiences a power-temperature differential minimum.

Due to the two outputs, this dual receiver polarizer system will involve not only phase and amplitude relationships to the input but also the relationships between the two outputs provided there is some specific input relationship.

Figure 3:
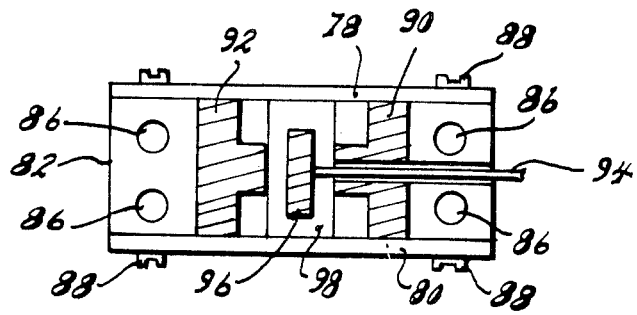
FIG. 3 is a cross-sectional representation of a phaser unit that is compatible with this invention.

In FIG. 3 there is show in cross section a typical phaser element that could be utilized in the waveguide system of the invention. The phaser consists of a top and bottom plate 78 and 80 respectively. The sides are formed of side plates 82 and 84 having cooling channels 86 located therein. A liquid coolant is circulated through the cooling channels to assure proper heat, thereby eliminating any distortion in the dimensions of the elements during operation.

For convenience the sides and top and bottom are held together by the screws 88. The "T" shaped cooling structures 90, 92 are formed of boron nitride. A charging wire 94 passes through one of the cooling structures into the core 96 of the toroid 98 in order to provide for adequate switching in the phaser element.

FIG. 4 shows a block diagram of a latching type driver used to switch the phaser element. The input pulse enters the isolation stage 100 and pulse shaping circuit 102 from a pulse generator (not shown). These elements are located at the input to each phaser element and isolate the driver from the pulse generator. After the pulse is shaped it enters the latching switch driver 104 where it is optimized and sent through the ferrite phase shifter 106 to the load. The output current to the ferrite load is bidirectional and its direction of flow through the load is dependent upon the polarity of the input pulse.

A schematic diagram of the phase shift driver is shown in FIG. 5. The input signal 110 consists of positive and negative input pulses approximately each 10 volts in amplitude. The negative gate pulses trigger the upper bank of transistors 112, 114 and 116 into conduction and generate a current pulse through the load (118) charging wire towards ground. Similarly, the positive gate pulses trigger the lower bank of transistors 120, 122 and 124, which results in a current pulse flowing through the load (118) charging wire in the reverse direction. The two current pulses alternately change the ferrite to a positive and negative value respectively.

In the driver, trimmer resistors 114 and 122 limit and set the two output pulse currents to the desired level.

I claim:
1. A variable polarizer for microwave systems comprising:
a first and second waveguide channel;
coupling means for interconnecting the first and second waveguide channels;
a plurality of adjustable phase shifting elements connected in parallel and in series in said first and second waveguide channels;
a source of input signal;
signal output means;
a first receiver means connected to the first waveguide channel;
a first duplexer means connected between said signal output means and said first receiver means;
a second receiver means connected to the second waveguide channel; and
a second duplexer means connected between the said signal output means and said second receiver means whereby microwave signals will be variably polarized in the first and second channels.